Feb. 26, 1957 A. BRUEDER 2,782,679
OPTICAL PROJECTION VIEWING AND INDICATING
MEANS FOR MEASURING INSTRUMENTS
Filed Oct. 19, 1954 2 Sheets-Sheet 2

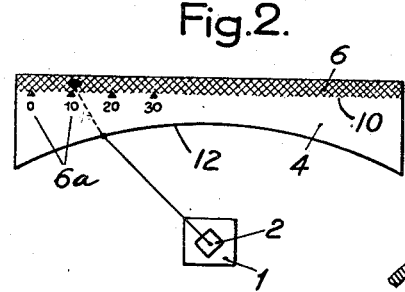
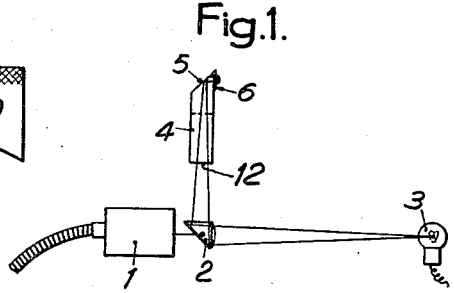
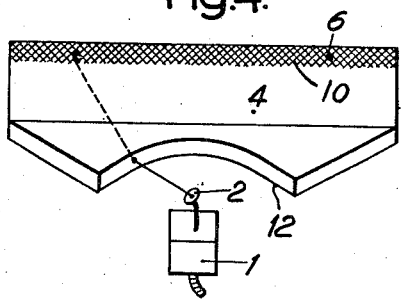
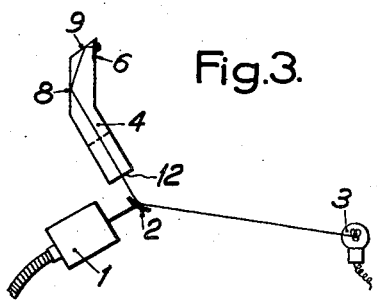
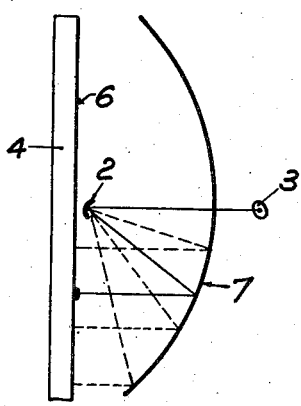
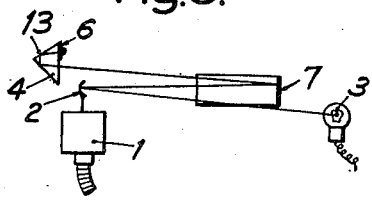

United States Patent Office 2,782,679
Patented Feb. 26, 1957

2,782,679

OPTICAL PROJECTION VIEWING AND INDICATING MEANS FOR MEASURING INSTRUMENTS

Antoine Brueder, Paris, France, assignor to Societe Anonyme Andre Citroen, Paris, France Application October 19, 1954, Serial No. 463,285

Claims priority, application France November 26, 1953

5 Claims. (Cl. 88—24)

This invention relates to a method of signalling through luminous or optical means the indications of measuring instruments such as speedometers, tachometers, ammeters, gasoline gages, etc., as usually provided on instrument panels of all types of land, sea and air vehicles.

As a rule, instrument panels are equipped with mechanical measuring instruments in which indexes or needles are displaced in front of scales carried by dials or the like; these devices are attended by many inconveniences in connection with the positioning, dimensions, illumination, etc., of the indicators, reading scales, etc.; they frequently require irregularly spaced graduation divisions, especially when rectilinear scales are employed, and also parallax corrections, etc.

The method according to this invention for displaying or inscribing on the dial of the instrument panel of a vehicle of any character the indications of a measuring instrument consists in directing onto a translucent scale carried by the panel a light beam reflected by a reflector secured on the movable output member of the indicating mechanism of the instrument.

Thus, the indications of the measuring instrument will appear on the reading scale—which may be as reduced in size as desired—in the form of a light spot acting as a substitute for the usual index or needle.

This optical conversion of the indications supplied by the measuring instruments equipping a dash board or instrument panel makes it possible to find new answers to the problems of space available, arrangement of parts, and appearance, which could not be solved on purely mechanical lines.

The device according to the invention is characterized essentially in that it comprises a light source of any suitable character, for example concentrated day-light with an electric bulb as an alternative therefor, a reflecting member adapted to reflect the light beam issuing from said source and rigid with the movable driven or output member of the measuring instrument, and a translucent block or "crystal," for example of plastic material, having a plan, graduated front or reading face with a light-receiving or input face adapted to concentrate with a proper elongation correction factor the light beam reflected by said reflecting member, after one or more reflexions thereof in the mass of said block, onto the said reading face.

The accompanying drawings forming part of this specification illustrate diagrammatically by way of example a few forms of embodiment of the invention.

In said drawings:

Figure 1 is a side view of a first embodiment;

Figure 2 is a corresponding front view from which the light source has been omitted for the sake of clarity;

Figures 3 and 4 are similar views showing modified embodiments of this invention;

Figure 5 is a side view showing another modification of this invention of which

Figure 6 is a corresponding plane view from above;

Figure 7:
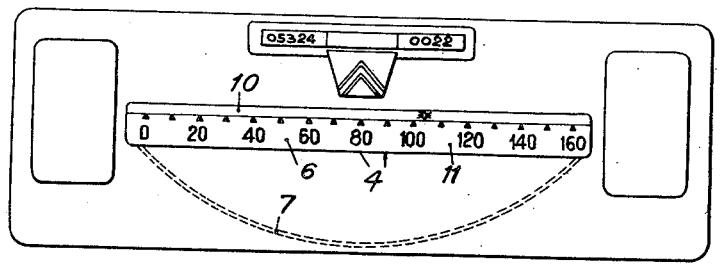
Figure 7 is a front view showing a similar embodiment more in details.

In these examples the measuring instruments and the dash-board or instrument panel are not described in detail but merely indicated, since their characters may vary within wide limits as they do not form part of the invention.

Referring firstly to the embodiment shown in Figs. 1 and 2 of the drawings, it will be seen that the measuring instrument 1 has keyed or otherwise drivingly connected or secured on its movable output member normally intended for indicating the measure performed by the instrument a mirror or prism 2 constantly illuminated by the light beam issuing from a bulb 3 or another, suitable light source; this light beam is reflected towards a transparent block 4 in which it is refracted by an input face 12 and further reflected by the bevelled edge 5 thereof in the direction of the front output face 6; this face 6 carries a ground or etched portion 10 and a suitable graduation 6a that constitutes the scale on which the reading is effected.

Obviously, according to the angular position of the reflector 2 the light spot appearing on the face 6 of block 4 will have a corresponding linear position on the graduation on said face and thus an optical indication may be read thereon.

One of the essential advantages of this device is that the spacing of the graduation lines or like divisions of the scale may be adjusted at will and that the linear or substantially linear displacements of the light spot may be made proportional to the angular displacement of the movable output member of the measuring instrument; this can actually be done by so selecting the type of curvature of the input face 12 through which the light beam enters the translucent block 4 that the refraction of this light beam will suppress the "tangent" factor of a rectilinear scale.

The light beam impinging on the reflector 2 may consist of day-light concentrated thereon by a lens or any other suitable device.

The shape and arrangement of the transparent block 4 and of the scale 6a may be varied at will according to the instrument panel design and arrangement and to the position of the measuring instrument therein.

Thus, Figs. 3 and 4 illustrate a particular embodiment of the device wherein the measuring instrument 1 is disposed obliquely relative to the scale-bearing face 6.

The light beam emitted by the lamp 3 and reflected by the reflector 2 is refracted as it penetrates by the input face 12 the block 4 and the latter is adapted to reflect this beam at 8 and 9 onto the ground or etched portion 10 of the reading face 6 carrying the graduated scale.

Elongation distortion may be corrected by resorting to reflection instead of refraction, as exemplified in Figs. 5 and 6 of the drawings. In this example the light beam emitted by the lamp 3 and reflected by the reflector 2 carried by the measuring instrument 1 is reflected again by another, part-cylindrical mirror 7 transmitting in turn the light beams in the form of parallel rays impinging on a block 4 of prismatic shape in which these parallel rays are reflected by the lower and upper inclined faces 13 to strike a graduated scale on the output face 6.

With this arrangement, it is possible to cause the reflected beam to have either a constant direction, or convergent directions as observed from the driver's seat, so that the light spot will constantly display a maximum brilliance irrespective of its position along the scale.

Figure 8:
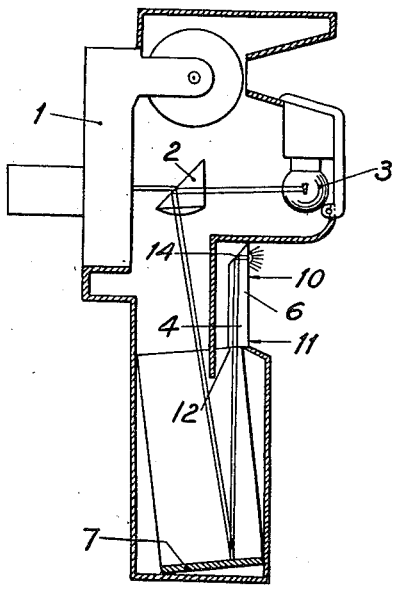
Figure 8 is a part-sectional side view corresponding to Fig. 7 and showing the same arrangement on a larger scale.

The embodiment shown in Figs. 7 and 8 of the drawings illustrate a practical design of the arrangement shown diagrammatically in Figs. 5 and 6. In this embodiment a trapezoidal-sectioned rod 4, made of transparent material, has its front face 6 ground or etched along its upper marginal portion 10, the remaining or lower portion 11 being left in its transparent condition. This arrangement also includes a part-cylindrical mirror 7, a measuring instrument 1 (in this case a speedometer with trip recorder and totalizer) having mounted on its movable output member a concave mirror or a prism of the total convergent reflection type 2, and finally a light source 3.

The light rays (in thin lines in Fig. 8) follow the path indicated from the light source 3 to the movable mirror 2 which reflects them onto the inner face of the part-cylindrical mirror 7 from which they are finally thrown back to the ground or etched portion 10 of rod 4.

If we consider the path followed by the light beam through this rod 4, we see that the beam enters the rod through its bottom or lower face 12, is reflected by the upper polished and bevelled face 14 (forming an angle of about 45° with the front face 6), and then forms a concentrated spot moving along the ground or etched portion 10 of the front face 6 of the rod 4, from one end to the other end thereof.

All the rays issuing from the part-cylindrical mirror 7 are substantially parallel with one another; a slight convergence may even be provided therein in order to obtain a maximum spot brilliance irrespective of its position along the scale; obviously, a part-cylindrical mirror is necessary to correct the tangent factor of the spot elongations.

The maximum spot brilliance may also be obtained through a proper arrangement of the sectional profile of the etching or grooves formed in the front face of the rod 4.

Although the above description refers to specific forms of embodiment of the invention, it will be readily understood by anybody conversant with the art that many modifications, alterations and adaptations thereof may be conceived without departing from the spirit and scope of the invention.

What I claim is:

1. A viewing apparatus, notably for instrument panels of vehicles, adapted to provide an indication of a measured value determined by the position of a movable member of a measuring instrument and adapted to be viewed by an observer whose eyes are in a substantially fixed position relative to the instrument panel, said apparatus comprising an optical system incorporating a light source providing a light pencil forming an image of said source, said light pencil moving substantially in a plane and being responsive to the position of said movable member, and a block of transparent material secured on the instrument panel and having an input face facing said light pencil and a plane output face having engraved thereon a straight graduated line facing the observer's eyes, said light pencil entering said block after passing through said input face and for any position of said movable member substantially in a same plane and parallel to a same direction in said plane, and issuing from said block through the output face thereof substantially in a plane passing through said graduated line and parallel to the perpendicular to said output face so as to form on said graduation an image of said light source, said light pencil continuing its travel towards the observer's eyes whereby the observer perceives the said image with a brightness value substantially independent of the position of said image along said graduated line and also independent, therefore, of the measurement to be read.

2. A viewing apparatus, notably for instrument panels of vehicles, adapted to provide an indication of a measured value determined by the position of a member pivoting about an axis of a measuring instrument, this indication being adapted to be viewed by an observer whose eyes are in a substantially fixed position relative to the instrument panel, said apparatus comprising an optical system incorporating a light source coincident with the axis of said pivoting member, a total-reflexion prism rigidly mounted on said pivoting member, said prism having a convex face directed towards said light source and a plane face parallel to said axis of said pivoting member, said prism reflecting the light pencil emitted from said source and received upon it convex face through its plane face in the form of another light pencil forming an image of said source, said other light pencil moving in a plane perpendicular to said axis of said pivoting member and being responsive to the position of said pivoting member, and a block of transparent material secured on said instrument panel and formed with an input face facing said axis of said pivoting member and having a curvature representing one portion of a cylinder having its generatrices parallel to said axis, said other light pencil entering said transparent block after being refracted by said input face and for any position of said movable member substantially in a same plane and substantially parallel to a same direction in said plane, said transparent block having a plane reflexion face set at 45 degrees for any position of said light pencil within said transparent block, and a plane output face perpendicular to said axis of said pivoting member, said output face having printed thereon a graduated straight line facing the observer's eyes, said reflexion face being adapted to reflect said other light pencil whereby it will normally impinge upon said output face so as to form on said graduated line an image of said light source, said light pencil continuing its travel towards the observer's eyes who perceives this image with a brightness value substantially independent of the position of said image along said graduated line and also independent, therefore, of the measurement to be read.

3. A viewing apparatus, notably for instrument panels of vehicles, adapted to provide an indication of a measured value determined by the position of a member pivoting about an axis of a measuring instrument, this indication being adapted to be viewed by an observer whose eyes are in a substantially fixed position relative to the instrument panel, said apparatus comprising an optical system incorporating a light source coincident with the axis of said pivoting member, a concave mirror rigidly secured on said pivoting member and set at 45 degrees with respect to said axis of said pivoting member, said concave mirror being adapted to reflect the light pencil received thereby in the form of another light pencil forming an image of said source and moving in a plane at right angles to said axis of said movable member in a manner responsive to the position of said pivoting member, and a transparent block secured on the instrument panel and formed with an input face facing said axis of said pivoting member and having a curvature representing one portion of a cylinder having its generatrices parallel to said axis, said other light pencil entering said transparent block after being refracted by said input face and for any position of said movable member substantially in a same plane and parallel to a same direction in said plane, said transparent block having a plane reflexion face set at the same angle irrespective of the positions of the light pencil entering said transparent block, said light pencil continuing its travel through said transparent block after being reflected by said reflexion face and irrespective of the position of said pivoting member in a same plane and substantially parallel to a same direction in said plane, said transparent block having another plane reflexion face whereby said light pencil is reflected again within said transparent block and continues its travel therethrough, irrespective of the position of said pivoting member, in a same plane substantially parallel to a same direction of said plane, said transparent block having a plane output face perpendicular to said last-mentioned direction, in which a straight graduated line is engraved and disposed in front of the observer's eyes, the light pencil reflected by said other reflexion face impinging normally upon said output face to form on said graduated line the image of said light source and continuing its travel towards the observer's eyes who perceives this image with a brightness value substantially independent of the position of the image along said graduated line and also independent, therefore, of the measurement to be read.

4. A viewing apparatus, notably for instrument panels of vehicles, adapted to provide an indication of a measured value determined by the position of a member pivoting about an axis of a measuring instrument, this indication being adapted to be viewed by an observer whose eyes are normally in a substantially fixed position relative to the instrument panel, said apparatus comprising an optical system incorporating a light source coincident with the axis of said pivoting member, a total-reflexion prism rigidly mounted on said pivoting member, said prism having a plane face facing said light source and a convex face directed laterally, said prism reflecting the light pencil emitted from said source and received through its convex face upon its plane face in the form of another light pencil constituting an image of said source, said other light pencil moving on a cone of revolution about the axis of said pivoting member very close to a plane in a manner responsive to the position of said pivoting member, a mirror having a cylindrical reflexion surface of which the generatrices are set at a uniform but very moderate angle with respect to said axis of said pivoting member, the concavity of said reflexion surface facing said convex face of said prism and receiving the new light pencil reflected by said convex face of said prism so as to reflect it, whereby said new light pencil will continue its travel irrespective of the position of said pivoting member in a same plane and parallel to a same direction in this plane, and a transparent block secured on the instrument panel and formed with a plane input face facing the reflecting surface of said cylindrical mirror and normally receiving said light pencil so that it penetrates said transparent block without any deviation, said transparent block having a plane reflexion face set at 45 degrees to the plane containing the different positions of said light pencil and on which the light pencil is reflected within said transparent block, irrespective of the position of said pivoting member in a same plane and substantially parallel to a same direction in said plane, said transparent block also having an output face perpendicular to said last-mentioned direction, said output face having one region intersected by said last-mentioned plane and directed towards the observer's eyes, this region being frosted and having engraved in said last-mentioned plane a straight graduated line, said light pencil normally impinging upon said region of said output face so as to form on said graduated line the image of said light source and continuing its travel towards the observer's eyes who perceives this image with a brightness value substantially independent of the position of said image along said graduated line and also independent, therefore, of the measurement to be read.

5. A viewing apparatus, notably for instrument panels of vehicles, adapted to provide an indication of a measured value determined by the position of a member pivoting about an axis of a measuring instrument, this indication being adapted to be read by an observer whose eyes are normally placed in a substantially fixed space in front of the instrument panel, said apparatus comprising an optical system incorporating a light source coincident with the axis of said pivoting member, a total-reflexion prism rigidly mounted on said pivoting member, said prism having a plane face facing said light source and a convex face directed laterally, said prism being adapted to reflect the light pencil emitted from said source and received by its plane face through its convex face in the form of another light pencil forming an image of said source, said other light pencil moving on a cone of revolution about said axis of said pivoting member very close to a plane in a manner responsive to the position of said pivoting member, a mirror having a cylindrical reflexion surface of which the generatrices are set at a uniform but very moderate angle with respect to said axis of said pivoting member, the concavity of said reflexion surface facing said convex face of said prism and receiving the new light pencil reflected by said convex face of said prism so as to reflect it, whereby said new light pencil will continue its travel irrespective of the position of said pivoting member in a same plane and in the direction of a same fixed point in said plane, and a transparent block secured on instrument panel and having a plane input face facing the reflexion surface of said cylindrical mirror and normally receiving the light pencil so that it penetrates said transparent block without being deviated, said transparent block having a plane reflexion face set at 45 degrees relative to the plane containing the different positions of said light pencil and reflecting said light pencil within said transparent block and for any position of said pivoting member in a same plane and in the direction of a same fixed point of said last-mentioned plane, said fixed point being positioned within the fixed space in which the observer's eyes are placed, said transparent block also having a plane output face having a region intersected by said last-mentioned plane and facing the observer's eyes, said region being frosted and provided in said plane with a graduated engraved line, said light pencil impinging normally upon said region of said output face so as to form on said graduated line the image of said light source and continuing its travel towards said fixed point located within said fixed space in which the observer's eyes are placed, whereby the observer will perceive this image with a brightness value substantially independent of the position of said image along said graduated line and also independent, therefore, of the measurement to be read.

References Cited in the file of this patent
UNITED STATES PATENTS

| | | |
|---|---|---|
| 1,859,020 | Brown | May 17, 1932 |
| 2,191,045 | Clayton | Feb. 20, 1940 |
| 2,347,665 | Christenson et al. | May 2, 1944 |
| 2,354,591 | Goldsmith | July 25, 1944 |
| 2,358,092 | Luboshez | Sept. 12, 1944 |
| 2,417,392 | Craig et al. | Mar. 11, 1947 |
| 2,471,800 | Von Mulinen | May 31, 1949 |
| 2,488,351 | Turrettini | Nov. 15, 1949 |
| 2,569,579 | Rinker | Oct. 2, 1951 |
| 2,676,515 | Diehl | Apr. 27, 1954 |
| 2,685,818 | Mihalakis | Aug. 10, 1954 |